(No Model.)
G. W. BUCK.
BORING AND TAPPING TOOL.
No. 391,777. Patented Oct. 30, 1888.
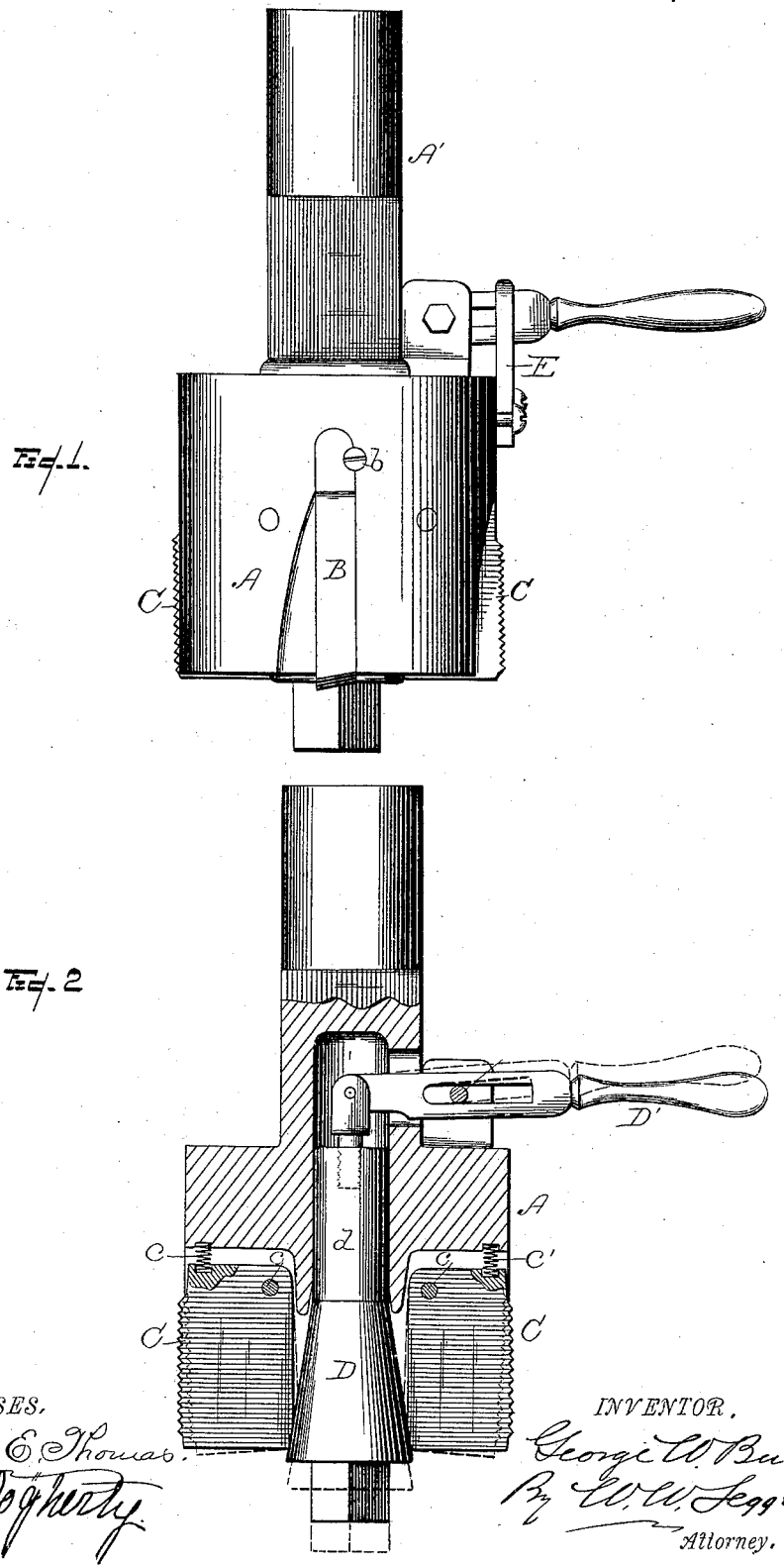

UNITED STATES PATENT OFFICE.

GEORGE W. BUCK, OF DETROIT, MICHIGAN, ASSIGNOR OF ONE-HALF TO HENRY E. CHAMPION, OF SAME PLACE.

BORING AND TAPPING TOOL.

SPECIFICATION forming part of Letters Patent No. 391,777, dated October 30, 1888.

Application filed August 27, 1888. Serial No. 283,937. (No model.)

*To all whom it may concern:*

Be it known that I, GEORGE W. BUCK, a citizen of the United States, residing at Detroit, county of Wayne, State of Michigan, have invented a certain new and useful Improvement in Boring and Tapping Tools; and I declare the following to be a full, clear, and exact description of the invention, such as will enable others skilled in the art to which it appertains to make and use the same, reference being had to the accompanying drawings, which form a part of this specification.

In the drawings, Figure 1 is a side elevation, and Fig. 2 a longitudinal section showing parts in elevation, of an apparatus embodying my invention.

My invention has for its object the production of a tool for boring and tapping, and wherein the boring may be first accomplished, and then, without stopping the tool or reversing its motion, the tool may be gigged back from the work, the tapping-dies be thrown into operative position, and the bored orifice be tapped.

The invention is designed for use in the tapping of the various styles of valves and fittings, and in other localities where it is designed to bore and tap.

In carrying out my invention, A represents the head of my tool; A' its shank, whereby it is engaged to the holder.

B represents one of its boring-bits, the same being in the nature of a plate set into a radial slot in the head and held by friction, or, if desired, by a countersunk screw, $b$, thus enabling it to be removed for dressing.

C represents tapping-dies. They are pivoted to the head by pivots $c$.

D is a central cone engaged with a shank, $d$, and the shank is engaged with a handle, D', which has a slot-and-pin engagement, $d'$, with the head.

E is a suitable hook adapted to engage the handle and hold it in place when the cone is drawn up into the head.

C' represents springs which hold the tapping-bits in against the cone.

The operation of the device will now be understood. When it is desired to bore and tap an orifice, the hook E is disengaged from the handle D', and the handle is raised so as to force the cone out from the end of the head. The springs C' will then tilt the tapping-dies in about their pivots $c$ until their cutting-edges are housed within the periphery of the head A. The tool now is entered and bores out the orifice. The tool or the work is now gigged back, and without stopping the tool and without reversing its motion the handle D' is forced down to the position shown in Fig. 1, and engaged with the hook E. This draws the cone D up into the head, its conical surface coming into contact with the backs of the tapping-dies C, force them out into their exact particular position for tapping the orifice, and holds them firmly in said position. The tool is again entered and taps the orifice. When the orifice has been tapped to a suitable depth, the hook E is loosened from the handle D', the handle is raised, and the tapping-dies are disengaged, so that the tool may be separated from the work without checking or reversing its motion.

Whenever it is desired to dress the taps, the pivots $c'$ may be pushed out and the tapping-dies removed.

With this tool the work of boring and tapping is very greatly facilitated, since without stopping the tool or reversing its motion the taps may be thrown out into position for work, and may likewise, without stopping or reversing, be thrown out of operation and housed within the periphery of the head.

What I claim is—

1. A combined boring and tapping tool, the same consisting of a head provided with stationary boring-bits, and, in connection therewith, pivoted tapping-bits, a cone for setting them out and holding them in operative position, means for actuating the said cone at will, and means for forcing the tapping-dies within the periphery of the head when the cone is retracted, substantially as and for the purposes described.

2. A combined boring and tapping tool, the same consisting of a head provided with stationary boring-bits, and, in connection therewith, pivoted tapping-dies, an adjustable cone for setting them out and holding them into operative position, and a lever for actuating the cone, substantially as and for the purposes described.

3. A combined boring and tapping tool consisting of a head provided with stationary boring-bits, and, in connection therewith, pivoted tapping-dies, a cone, an actuating-handle for setting out said tapping-dies and holding them in operative position, means for holding the cone when drawn inward, and springs for forcing the dies within the head when the cone is retracted, substantially as and for the purposes described.

In testimony whereof I sign this specification in the presence of two witnesses.

GEORGE his X W. BUCK.
mark.

Witnesses:
M. B. O'DOGHERTY,
W. H. CHAMBERLIN.